United States Patent
Betscher et al.

(10) Patent No.: US 9,581,123 B2
(45) Date of Patent: Feb. 28, 2017

(54) ELECTRONIC SAFETY SHUTDOWN SYSTEM FOR MOTOR VEHICLES

(71) Applicant: Auto-Kabel Management GmbH, Hausen i.W. (DE)

(72) Inventors: Simon Betscher, Grevenbroich (DE); Wacim Tazarine, Mönchengladbach (DE); Robert Kampmann, Mönchengladbach (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 14/902,925

(22) PCT Filed: Apr. 15, 2014

(86) PCT No.: PCT/EP2014/057592
§ 371 (c)(1),
(2) Date: Jan. 5, 2016

(87) PCT Pub. No.: WO2015/007406
PCT Pub. Date: Jan. 22, 2015

(65) Prior Publication Data
US 2016/0177907 A1    Jun. 23, 2016

(30) Foreign Application Priority Data

Jul. 15, 2013  (DE) .................. 10 2013 011 719
Aug. 13, 2013  (DE) .................. 10 2013 013 369

(51) Int. Cl.
*F02N 11/08* (2006.01)
*B60R 16/03* (2006.01)

(52) U.S. Cl.
CPC ............ *F02N 11/087* (2013.01); *B60R 16/03* (2013.01); *F02N 2011/0874* (2013.01); *F02N 2250/02* (2013.01)

(58) Field of Classification Search
CPC ........... F02N 11/087; F02N 2011/0874; B60R 16/03; B60R 25/04
See application file for complete search history.

(56) References Cited

U.S. PATENT DOCUMENTS 6,229,279 B1 *   5/2001   Dierker ................ H02J 7/0013
                                                 307/10.1
6,731,021 B1 *   5/2004   Urlass .................. H02J 7/1423
                                                 307/10.1
(Continued)

FOREIGN PATENT DOCUMENTS

CN        102273047        12/2011  ............... H02J 7/34
DE        39 30 153 A1      3/1991  ............ B60R 16/02
(Continued)

OTHER PUBLICATIONS

The German Patent and Trademark Office, Office Action—Application No. 10 2013 013 369.6, dated Apr. 10, 2014, 10 pages.
(Continued)

*Primary Examiner* — Jung Kim
*Assistant Examiner* — Rafael Pacheco
(74) *Attorney, Agent, or Firm* — Sunstein Kann Murphy & Timbers LLP

(57) ABSTRACT

Electronic switch in motor vehicles comprising a switch network having an input, a first output and a second output and a first switch element arranged between the first output and the second output, a second switch element arranged between the input and the first output, and a third switch element arranged between the input and the second output. Starting switch-on current limitation is enabled if the input can be electrically connected to a battery pole, the first output can be connected to a generator-battery line, and the second output can be connected to a starter-battery line.

22 Claims, 1 Drawing Sheet

(56) References Cited

U.S. PATENT DOCUMENTS

Figure 1:
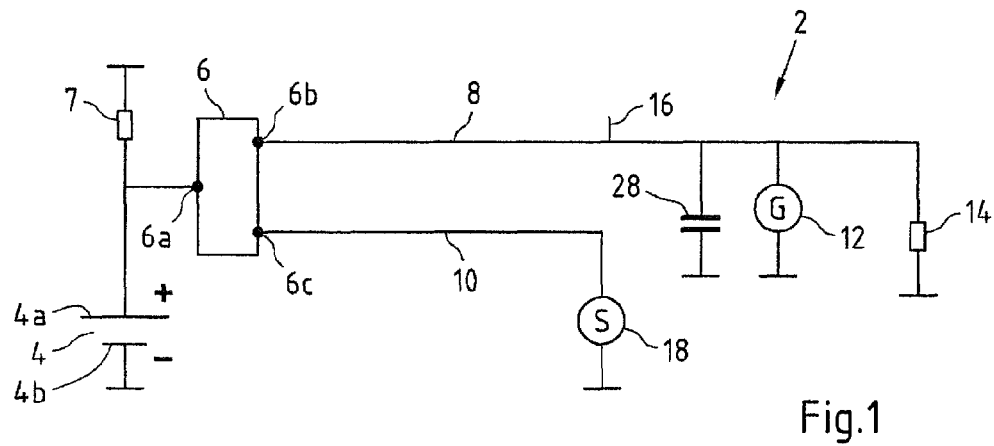

2008/0079389 A1* 4/2008 Howell ................. H02J 7/1438
320/104
2012/0035836 A1 2/2012 Mueller et al. ............... 701/113

FOREIGN PATENT DOCUMENTS

| | | | |
|---|---|---|---|
| DE | 199 57 478 A1 | 5/2001 | ............ B60R 16/04 |
| DE | 100 14 243 A1 | 10/2001 | ............ B60R 16/04 |
| DE | 102 10 537 | 9/2003 | ............ F02N 11/04 |
| DE | 10 2008 032 138 A1 | 1/2010 | ............ B60R 16/03 |
| DE | 10 2009 0000 46 A1 | 7/2010 | ............ B60R 16/03 |
| DE | 10 2010 030384 A1 | 12/2011 | ............ F02N 11/08 |
| EP | 1 137 150 A2 | 9/2001 | ............... H02J 7/00 |
| EP | 1 677 327 A1 | 7/2006 | ............ H01H 50/20 |
| EP | 1 729 392 A2 | 12/2006 | ............... H02J 1/08 |
| EP | 1 481 163 B1 | 8/2008 | ............ F02N 11/08 |
| FR | 2 729 901 A1 | 8/1996 | ............... H02J 7/14 |
| FR | 2729901 A1 * | 8/1996 | ........... H02J 7/1423 |

OTHER PUBLICATIONS

International Searching Authority, International Search Report—International Application No. PCT/EP2014/057592, dated Apr. 15, 2014, together with the Written Opinion of the International Searching Authority, 11 pages.

State Intellectual Property Office of P.R.C., Notification of the First Office Action—Application No. 201480040451.6, dated Jul. 5, 2016, 8 pages (English translation).

* cited by examiner

ELECTRONIC SAFETY SHUTDOWN SYSTEM FOR MOTOR VEHICLES

The subject matter relates to an electronic switch in motor vehicles comprising a switch network. Furthermore, the subject matter relates to a system having an electronic switch and a method for actuating such an electronic switch.

Internal combustion engines in motor vehicles do not provide any torque when at a standstill. For this reason, it has not been possible so far to start such internal combustion engines independently by injecting fuel. This means that a torque must be applied to the internal combustion engine inside the vehicle in order to start the engine. This torque is generally provided by a starter or an electrical machine. Such an electrical machine is necessary to start the internal combustion engine.

The starter of the internal combustion engine is supplied by the battery of the motor vehicle. During starting, i.e. when the starter starts up, the inductive load of said starter is of low resistance and a very high current flows from the battery via the starter. The inductance of the starter virtually forms a short circuit at the moment of starting. The high current flow induced thereby results in drops in the battery voltage at the battery poles. During a typical starting process of a vehicle, the battery voltage drops to below a limit value after a short time. As a result, it is possible that other consumers in the electrical system of the vehicle that require a minimum voltage can no longer be supplied with sufficient electrical energy.

The drop in voltage occurs during the starting process in all vehicles with internal combustion engines, if the internal combustion engine is started by means of a starter. Vehicles can be for example cars, rail vehicles or aircraft. Ships are also vehicles within the meaning of the subject matter.

To prevent this drop in voltage during the starting process, in particular in stop-start operation, as has now become customary to save fuel, there is a multiplicity of voltage support concepts, such as the use of supporting capacitors, the use of additional batteries and also the use of starting current limiting systems.

A starting voltage or starting current limiting system is also known as a starting voltage drop limiter (SEB), start current limiter (SCL), start current control (SCC), voltage drop limiter (VDL) or the like. Such a starting current limiting system limits the starting voltage drop by reducing the current that flows from the battery to the starter. Voltage drops to a defined lower limit are still accepted for. Moreover, a starting time delay is accepted for, since the starter does not receive all the available electrical energy of the battery during the starting process, but only a limited amount.

During the starting process with a conventional battery, the battery voltage drops to less than 8 V after a few milliseconds. This initial voltage drop affects all the electrical consumers connected to the battery. The initial voltage drop, which occurs only briefly, could be compensated for example by buffer capacitors connected upstream. During a conventional starting process, the voltage of the battery briefly recovers to over 9 V immediately after starting but then drops to less than 9 V again. This second voltage drop cannot be absorbed by conventional buffer capacitors, since their capacity is only sufficient to compensate the first voltage drop. The buffer capacitors are regularly discharged after the first voltage drop, and the second voltage drop during a starting process results in problems within the vehicle electrical system. In particular engine control devices and airbag devices, as well as other control devices, can drop out temporarily, because not every control device is designed for such a low voltage level of less than 9 V.

Starting current limiting systems are generally arranged between the battery and the starter. Conventional vehicle electrical system topologies contain a battery, a starter, a generator and at least one consumer network. Depending on the concept, the starter and the generator are supplied with a separate line each or with a combined starter-generator line. To prevent short circuits in the event of a crash, the starter line or the starter-generator line is irreversibly disconnected from the vehicle electrical system by a "battery safety terminal".

To limit the voltage drop at the battery, a starting current limiting system must be provided in addition to the fuse in the event of a crash.

Conventional fuses of battery lines are provided by irreversible switches, in particular in the form of a pyrotechnic switching element. In the event of a crash, a control pulse, preferably from an airbag control device, is received and a pyrotechnic switch is triggered. This results in the positive battery pole being disconnected from the vehicle network. In particular, the starter and the generator lines are disconnected from the positive battery pole. If such disconnection elements are used, a parallel circuit of a consumer network to the starter and generator can remain connected to the battery in order to be able to maintain safety functions inside the vehicle. Nevertheless, it is no longer possible to restart the vehicle after such a triggering process, and it must be towed away. Furthermore, the safety components must be completely replaced.

The subject matter is therefore based on the object of providing a maintenance-friendly switch that can be used flexibly for a battery line, in particular for generator-battery lines and/or starter-battery lines of a vehicle.

This object is achieved by an electronic switch according to Claim 1, a system according to Claim 11, and a method according to Claim 21.

It was found that both the starter-battery line and the generator-battery line can be fused by a suitable switch network. Each of these two lines can be connected in parallel to each other to a positive battery pole via the electronic switch forming the subject matter. To this end, the electronic switch forming the subject matter is substantially short-circuited on the input side to the positive pole of the battery. Two connections can be provided on the output side of the switch network forming the subject matter. A first connection can be used to connect to a generator-battery line and a second output can be designed to connect to a starter-battery line.

In current motor vehicles in particular, both the generator-battery wire (line) and the starter-battery wire (line) are formed as flat wires (line), preferably consisting of solid material, or as round wires (line), preferably as cables or stranded wires. The wires are preferably formed from aluminium or aluminium alloys, in particular with a purity of at least 99.5%, or from copper or copper alloys. To enable the wire to make contact with the respective first and second outputs, the latter are provided with suitable connection terminals. If aluminium is used, it is possible for the connection terminals to have an aluminium surface on the output side, in order to ensure contact with the respective generator-battery wire or starter-battery wire of the same type. On the switch network side, the terminals can be formed from copper or brass or other suitable metals.

Three switch elements, which preferably can be switched separately from each other, can be provided in the switch network between the battery pole and the starter or generator. A first switch element can be switched electrically between the two outputs. A second switch element is electrically arranged between the input and the first output, and a third switch element is electrically arranged between the input and the second output. The first output can therefore be short-circuited to the second output with the first switch element. The first output and the input can be short-circuited with the second switch element, and the input and the second output can be short-circuited to each other with the third switch element.

Each of the switch elements has a contact resistance, although a low one, and represents an ohmic resistance in the connection between the battery and the generator or starter. To keep the power loss in the switch network low, it is preferred if the switch elements have a resistance of less than 10 mOhm, preferably less than 1 mOhm, particularly preferably less than 0.1 mOhm. Furthermore, the connections and lines of the switch network are preferably designed such that there is a resistance of less than 10 mOhm, preferably less than 1 mOhm, particularly preferably less than 0.1 mOhm between the input and in each case one output of the switch network.

Suitable interconnection of the switch elements makes it possible to ensure disconnection of the battery wires (starter-battery/generator-battery wire) in the event of a crash. A starting switch-on current limiting system can also be realised, inter alia, because the switch elements have contact resistances. The electronic switch forming the subject matter can therefore be used flexibly and is used firstly to fuse the starter-battery wire and the generator-battery wire and secondly as a starting switch-on current limiting system.

The electronic switch can be used not only in vehicles such as cars and trucks with internal combustion engines, but also in rail vehicles, aircraft, ships or the like, whether operated purely electrically or with an internal combustion engine.

The switch network forming the subject matter is preferably arranged in the vicinity of the electric battery, in particular the vehicle battery, in particular the starter battery of the motor vehicle. It is generally a 12, 24 or 48 V battery.

To keep the electrical power loss between the switch network and the battery pole as low as possible, it is proposed that it be possible substantially to short-circuit the input to a positive battery pole. If the switch network is connected to the positive battery pole, it is possible to disconnect the battery lines to the generator and to the starter by means of the switch network. The coupling of the switch network to the positive battery pole should preferably be as close as possible to prevent a short circuit to the body or to the negative battery pole arising on the electrical line between the switch network and the positive battery pole. Leakage currents and power loss can be prevented by disconnection when the vehicle is at a standstill. In particular, consumers that are arranged in the branch of the generator-battery line can likewise be disconnected.

Particularly simple installation in a motor vehicle network can be implemented if the switch network or electronic switch is encapsulated in a housing. The different switch elements are provided in the housing, and preferably only the two outputs and the input project out of the housing as electrical contact elements. It is also possible for a signal line to be routed into the housing or for outwardly projecting signal connections to be present on the housing.

To guarantee the different functions, it is possible for individual switch elements of the switch network to be actuated separately. Preferably, each individual switch element in the switch network can be actuated separately. By actuating the first switch element, it is possible to short-circuit the two outputs to each other and therefore to short-circuit the generator-battery wire directly to the starter-battery wire via the first switch.

The second switch element can be used to short-circuit the first output to the input. This makes it possible, for example, to short-circuit the battery pole to the generator-battery wire. In particular the positive battery pole. The third switch element enables a short circuit between the input and the second output. This makes it possible, for example, to short-circuit the battery pole to the starter-battery wire.

The switch elements are opened and closed by means of a corresponding control pulse from a control device. The control device is preferably arranged outside the electronic switch, in particular also outside the housing. It is also possible for the control device to be part of the switch network. The control device can then be arranged in the housing. The control device can be formed as a part of a switch element. The control device can be arranged in a switch element that acts as a "master". Then the other switch elements can act as "slaves" of this "master".

To make switching from outside the housing possible, it is proposed that a preferably multi-core control line be routed into the housing to switch the switch elements. Control pulses that are used to switch the switch elements inside the housing can thus be generated from outside. This provides the greatest possible flexibility with regard to the arrangement of the control device and allows the housing itself to be miniaturised.

The housing of the switch network can be arranged in a pole recess of a vehicle battery, which both saves space and also is electrically favourable. The input is then directly on the battery pole, preferably the positive battery pole. It is possible for the housing to be formed as part of a battery terminal. On the other hand, the pole recess is present anyway, and the arrangement of the housing in the pole recess means a minimal space requirement. The vehicle topology does not then have to be changed.

A battery is regularly provided with a standardised pole recess. In particular, DIN standards DIN EN 50342-2 and DIN 72311 specify standard dimensions for the pole recess and a housing offset of the battery running between the pole recesses. The pole recess is the region that has the battery pole and is delimited by side walls of the battery on one side and outer edges of the battery on the other side. The pole recess preferably has maximum dimensions of 60 mm×72.5 mm. The depth of the pole recess is regularly between 30 and 40 mm, preferably less than 35 mm. The switch network can be arranged inside this installation space, preferably using the elongate offset running between the pole recesses. It is self-evident that the spatial arrangement of the switch network inside the pole recess can be understood as meaning that most of the assembly is arranged therein. If the assemblies are partially outside the pole recess but still mostly inside the pole recess, this is included within the meaning of the term "spatially inside the pole recess".

The switch elements can be formed from parallel circuits of individual switches, which can in turn have individual switches and be parallel-connected. It is also possible for anti-serial switches, for example in the form of transistors connected in opposite directions, to be provided in the switch elements. The switch elements can thus switch current both unidirectionally and bidirectionally. Preferably, diodes can also be provided in the switch elements, to enable current flow in only one direction, for example. For example, such diodes can at least be the respective intrinsic diodes (body diodes) that are present in the semiconductors anyway. In addition, a free-wheeling diode can be used, preferably as a new, additional component, to relieve the semiconductor.

According to one exemplary embodiment, it is proposed that a switch element have at least one electronic switch. An electronic switch can be formed as a semiconductor switch, for example. This can be for example a transistor switch, a MOSFET switch, an IGBT switch or the like. Electrical switches such as contactors or relays can also be provided.

The switch elements can be formed from a parallel circuit of in each case at least one diode and one switch. The second and third switch elements preferably each have at least one diode, the forward direction of which points in the direction of the battery. The first switch element can have a parallel circuit of at least one diode and one switch. The forward direction of this diode can point from the starter-battery line or the second output in the direction of the generator-battery line or the first output.

This diode of the first switch can be used to prevent the current flowing from the generator-battery line to the starter-battery line and/or to the starter while the first switch is open.

As mentioned above, the switch elements can be formed from a plurality of switches. Therefore, it is also proposed that a switch element be formed from a parallel circuit of at least two switches that can be switched separately. In particular, a high current-carrying capacity and/or a low contact resistance is necessary to operate a starter-battery line and a generator-battery line properly. When an internal combustion engine starts, a current of several 100 amperes generally flows from the battery to the starter. Semiconductor switches must be designed for such high currents, and the power loss via these switches should be as low as possible. It can be more favourable to connect a plurality of semiconductors in parallel to provide the desired contact resistance in total by means of the parallel connection of the individual semiconductor switches. A parallel connection of a plurality of semiconductor switches can also be used to compensate the failure of an individual semiconductor switch if necessary. Furthermore, the contact resistance of the switch element can be varied by cascaded connection of semiconductor switches within a switch element, which can be relevant in particular for the starting switch-on current limiting system. For instance, it is possible for only a few semiconductor switches within a switch element to be closed initially and for more semiconductor switches to be switched gradually.

It is possible in particular in this case to charge the buffer capacitor, which is often connected to the generator-battery line, during a pre-starting phase, that is, before any current has been supplied to the starter. To this end, for example, the second switch element or the third and the first switch element can be closed during the pre-starting phase in order to charge the capacitor. To obtain the most uniform charge current possible, the second switch element or the third and/or the first switch element can also be closed and opened in a pulsed manner. The charge current can then be influenced and the capacitor can be charged as protectively as possible. After the pre-starting phase, the starting current for the starter can be switched by first closing the third switch element, also in a pulsed manner if necessary.

It is also possible for the current between battery and starter to be switched in a pulsed manner. Pulsed switching of the switch elements can be used to set a more moderate resistance value, which is also relevant for the switch-on current limiting system.

A system having an above-described electronic switch is also proposed. The system is preferably used in a motor vehicle, in particular with an internal combustion engine. The system is composed of a battery line (wire), which is connected to a battery pole, a generator-battery line (wire) and a starter-battery line (wire). The battery pole is connected to the input of the electronic switch via the battery line. The first output is connected to the generator-battery line, and the second output is connected to the starter-battery line. The system thus provides a switching function arranged between battery and starter or generator.

In the system forming the subject matter, the switch network is preferably arranged in the spatial vicinity of the battery, in particular at a distance of less than 50 cm. For particularly low power loss on the battery line, a line length of less than 50 cm is proposed between a battery pole and the input. Moreover, the susceptibility to short circuits must be kept as low as possible for the section of line between the battery pole and the input, which can also be implemented inter alia by a short line length.

A preferred position of the arrangement of the switch network is a battery tray. The switch network can be arranged in the direct vicinity of the battery therein.

In the system forming the subject matter, a control circuit can be provided, as described above. Said circuit is designed to switch the individual switch elements depending on vehicle states. For instance, a disconnection of the starter-battery line and/or or the generator-battery line can take place. For instance, leakage current corrosion can be reduced or avoided by disconnecting said lines from the positive battery pole when the vehicle is at a standstill.

To this end, it is possible for example for at least the second switch, preferably the second switch and the third switch, to be open when the vehicle is at a standstill.

During starting, in particular during warm starting in stop-start operation, it is often necessary to prevent a voltage drop to less than 9 V. To achieve this, the current from the battery to the starter must be controlled. In the first hundred milliseconds, preferably in the first second, in particular within the first two seconds of the starting process, a very high current flows from the battery to the starter. To reduce this, it is proposed that at least only the third switch element be closed at the beginning of the starting process. It is also possible for the second and third switch elements to be closed at the beginning of the starting process. The first switch element can be switched too only after a certain starting time has elapsed. It is also possible for the first, second and third switch elements to be closed at the beginning of the starting process.

The switch elements can also be opened and closed depending on a charge state of the battery (SOC) or a status of the battery (State Of Health). For instance, if the battery voltage is low, i.e. if the SOC is poor, a voltage drop can be taken into account by pulsed switching of the third switch element. The first switch element can also be switched on later or also in a pulsed manner if necessary, to load the battery as protectively as possible.

The state of the switch elements can also be monitored by means of the control circuit. If a switch fails, in particular the second or third switch, the failed switch can be bypassed by closing the other switch and the first switch and thus a malfunction can be avoided.

A first portion of electrical consumers of the motor vehicle can be arranged in the generator-battery line or in the section that connects the generator-battery line to the switch network.

A second portion of electrical consumers can be connected directly to the positive battery pole without being fused via the switch network. These consumers can be for example consumers that are critical to safety and must not be switched off.

The subject matter is further formed by a method according to Claim 21 and a method according to Claim 22. The switching of the switch elements depending on the vehicle states allows adaptive control of the resistance between battery and starter and between battery and generator and thus influence on the current in the generator-battery line and on the starter-battery line.

Figure 2:
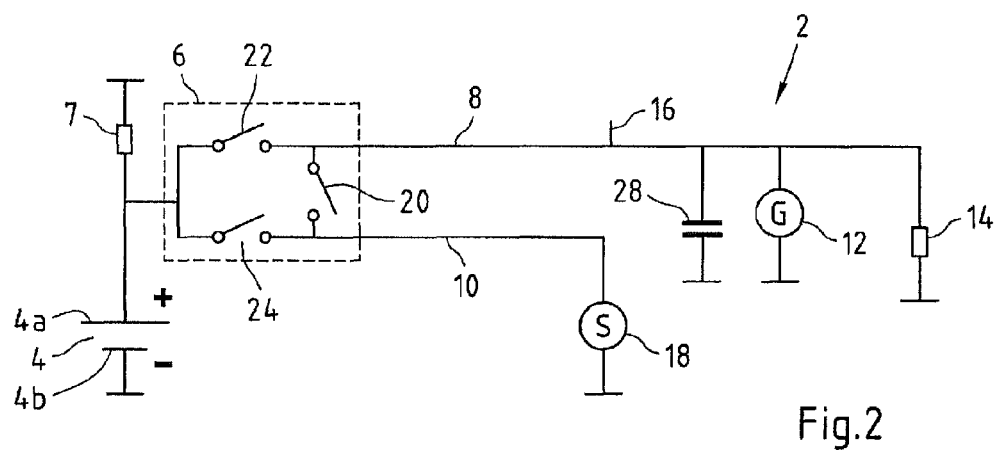
Figure 3:
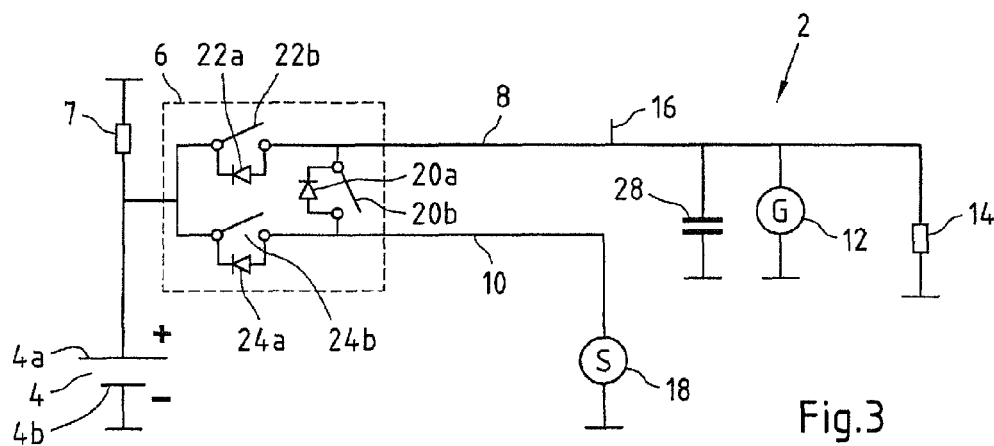

The subject matter is explained in more detail below using a drawing showing embodiments. In the drawing show:

FIG. 1 a general vehicle electrical system topology with a switch network;

FIG. 2 a detailed vehicle electrical system topology with a switch network;

FIG. 3 a vehicle electrical system topology with switch elements, some of which are unidirectional.

FIG. 1 shows a vehicle electrical system topology 2 of a motor vehicle. The vehicle electrical system topology has a motor vehicle battery 4 with a positive pole 4a and a negative pole 4b. The negative pole 4b is regularly connected to the body of the motor vehicle. An electronic switch 6 is arranged in the direct spatial and electrical vicinity of the positive pole 4a of the battery 4. The electronic switch allows flexible switching of battery lines connected thereto, such as a starter-battery line 10 and/or a generator-battery line 8 and in particular starting switch-on current limitation and disconnection in the event of an accident or standstill.

It is possible to connect a consumer network, indicated schematically with a resistor 7, to the positive battery pole 4a parallel to the electronic switch 6. This consumer network 7 comprises in particular safety-critical consumers, which must never be disconnected from the battery.

The electronic switch 6 has an input 6a and a first output 6b and a second output 6c.

The input 6a is short-circuited to the positive battery pole 4a. The first output 6b is connected to a generator-battery line 8. The second output 6c is connected to a starter-battery line 10. Both lines 8, 10 can be formed as flat lines and/or round lines, in particular as solid aluminium lines and/or copper lines. The generator-battery line is connected directly to the generator 12. Moreover, a further consumer network 14 can be provided on the section of the generator-battery line 8. These consumers can be for example comfort consumers, which do not necessarily have to be supplied with electrical power from the battery 4 in the event of a crash or when the vehicle is at a standstill. An external starting support point 16 can also be provided on the generator-battery line 8.

The starter-battery line 10, which is connected to the starter 18, is provided parallel to the generator-battery line 8. In the case shown, the earth return to the negative battery pole 4b takes place via the body, but can also take place via a separate earth line. The earth return takes place via a separate line in particular in high-voltage networks.

The switch 6 according to the invention is characterised by a switch network as shown in FIG. 2. The switch 6 can be encapsulated in a housing, which is indicated with dashed lines. The switch network of the switch 6 is composed of a first switch element 20, a second switch element 22 and a third switch element 24.

The switch elements 20-24 can be formed as electrical switches, for example as relays or contactors, or as semiconductor switches. The switch elements 20-24 can in particular be formed from parallel circuits of semiconductor switches.

A control circuit (not shown) is provided to influence, in particular to open and close, the switching states of the switch elements 20-24, and preferably to communicate with a control device present in the vehicle.

The switch elements 22 and 24 can be open when the vehicle is at a standstill. This means that the positive battery pole 4a is electrically disconnected from the two lines 8, 10. The two lines 8, 10 are de-energised, and corrosion owing to leakage current corrosion is avoided on these lines 8, 10 and in particular at the respective contact points.

When the vehicle is to be started, the switch 24 can be closed and the starter 18 is supplied with electrical power from the battery 4. The switch element 22 can then likewise be closed.

It is possible to vary the resistance of the switch 6 by for example initially closing only the switch 24. The initial starting current flows via this switch 24 to the starter 18. After a certain starting time, for example a few milliseconds, the switches 22 and/or 20 are also closed and the total resistance between the battery 4 and the starter 8 via the switch 6 is thus reduced. A higher current flows to the starter 18. When starting, it is possible to vary the resistance and thus limit the starting switch-on current from the battery 4 to the starter 18 by pulsed switching of the switch elements 20-24.

The control circuit (not shown) also monitors the states of the switch elements 20-24. If, for example, the switch element 22 fails, it is possible to bypass the switch element 22 by closing the switch elements 20, 24. On the other hand, it is also possible to bypass a failure of the switch element 24 by closing the switch elements 20, 22.

FIG. 3 shows the electronic switch 6 in a vehicle electrical system topology 2 that corresponds to that of FIG. 1 and FIG. 2. In addition to the switch elements 20, 22 and 24 shown in FIG. 2, which are all formed for example from a respective parallel circuit of semiconductor switches, parallel-connected unidirectional components, for example diodes 20a, 22a, 24a or the like, are provided. It can be seen that the diode 20a is arranged in such a manner that its forward direction points from the first output to the second output. The diode 22a is arranged in such a manner that its forward direction points from the first output to the input. The diode 24a is arranged in such a manner that its forward direction points from the second output to the input.

The battery is protected from undesirable discharging by the diodes 22a and 24a.

The arrangement of the diode 20b allows the current to flow from the output of the switch 22b in the direction of the starter line 10 when the switch 20b is open. If the diode 20b were in the opposite direction, the large drop in voltage that results from the high current for the starter (starter peak) would affect the generator line 8 via the diode 20a (reversed direction) when the switch 20b was open.

The electronic switch 6 shown offers enormous flexibility with regard to short-circuit-safety and starting switch-on current limitation. The electronic switch 6 can be encapsulated in a housing and for example arranged in a pole recess (not shown) or in a battery tray or bias current distributor in particular in the engine compartment.

The invention claimed is:

1. Vehicle electrical system with an electronic switch comprising:
a switch network having
an input, a first output and a second output and
a first switch element arranged between the first output and the second output, a second switch element arranged between the input and the first output and
a third switch element arranged between the input and the second output;
wherein the input is electrically connected to a battery pole through a battery line,
the first output is connected to a generator-battery line, and the second output is connected to a starter-battery line; and
a control circuit connected to the switch elements to switch the switch elements depending on vehicle states, wherein the control circuit is configured to monitor the state of the switch elements, and if a switch element is in a fault state electrically bypasses the defective switch element by switching at least one other switch element.

2. Vehicle electrical system according to claim 1, wherein the input is substantially short-circuited to a positive battery pole.

3. Vehicle electrical system according to claim 1, wherein a resistance between the input and at least one of the outputs is less than 10 mOhm.

4. Vehicle electrical system according to claim 1, wherein the switch elements in the switch network can each be actuated separately.

5. Vehicle electrical system according to claim 1, wherein the switch network is encapsulated in a housing.

6. Vehicle electrical system according to claim 5, wherein a multi-core control line is routed into the housing to the switch elements.

7. Vehicle electrical system according to claim 5, wherein the housing fits a pole recess of a vehicle battery.

8. Vehicle electrical system according to claim 1, wherein at least one of the switch elements includes an electronic switch, in particular a semiconductor switch, a transistor switch, a MOSFET switch, an IGBT switch or an electrical switch, in particular a relay, or an anti-serial switch.

9. Vehicle electrical system according to claim 1, wherein at least one of the switch elements is formed from a parallel circuit of at least two switches that can be switched separately.

10. Vehicle electrical system according to claim 1, wherein a switch element can be switched in a pulsed manner.

11. Vehicle electrical system according to claim 1, wherein the switch network is arranged in the spatial vicinity of a battery, in particular at a distance of less than 50 cm, in particular that a line length between a battery pole and the input is less than 50 CM.

12. Vehicle electrical system according to claim 1, wherein the switch network is arranged in a battery tray or bias current distributor.

13. Vehicle electrical system according to claim 1, wherein the switch network is arranged in a pole recess of the battery.

14. Vehicle electrical system with an electronic switch comprising:
a switch network having
an input, a first output and a second output and
a first switch element arranged between the first output and the second output,
a second switch element arranged between the input and the first output and
a third switch element arranged between the input and the second output, wherein
the input is electrically connected to a battery pole through a battery line,
the first output is connected to a generator-battery line, and
the second output is connected to a starter-battery line, and
a control circuit connected to the switch elements to switch the switch elements depending on vehicle states, the control circuit being configured so that during a warm start of an internal combustion engine of the vehicle, the control circuit initially closes only the second switch element and the third switch element for a starting period of less than 2 seconds and additionally closes the first switch element after the starting period has elapsed.

15. Vehicle electrical system according to claim 14, wherein the control circuit opens at least the second switch element when the vehicle is at a standstill.

16. Vehicle electrical system according to claim 1, wherein during a warm start of an internal combustion engine of the vehicle, the control circuit initially closes only the second switch element and the third switch element for a starting period of less than 2 seconds and additionally closes the first switch element after the starting period has elapsed.

17. Vehicle electrical system according to claim 14, wherein the control circuit is configured to monitor the state of the switch elements, and if a switch element is in a fault state electrically to bypass the defective switch element by switching at least one other switch element.

18. Vehicle electrical system according to claim 1, wherein the generator-battery line is connected to a first portion of electrical consumers.

19. Vehicle electrical system according to claim 1, wherein a battery is connected to a second portion of electrical consumers parallel to the switch network.

20. Method for actuating a vehicle electrical system wherein the vehicle electrical system includes
a switch network having
an input, a first output and a second output and
a first switch element arranged between the first output and the second output,
a second switch element arranged between the input and the first output and
a third switch element arranged between the input and the second output, wherein
the input is electrically connected to a battery pole through a battery line,
the first output is connected to a generator-battery line, and
the second output is connected to a starter-battery line,
wherein the actuating method comprises:
during a warm start of an internal combustion engine of the vehicle, initially closing only the second switch element and the third switch element for a starting period of preferably less than 2 seconds and
closing the first switch element after the starting period has elapsed.

21. The method according to claim 20, wherein if the second switch element malfunctions, the input is connected to the first output by closing the first switch element and the third switch element, and if the third switch element malfunctions, the input is connected to the second output by closing the first switch element and the second switch element.

22. The method according to claim 20 further comprising opening at least the second or the third switch element when the vehicle is at a standstill.

* * * * *

UNITED STATES PATENT AND TRADEMARK OFFICE
CERTIFICATE OF CORRECTION

PATENT NO. : 9,581,123 B2  Page 1 of 1
APPLICATION NO. : 14/902925
DATED : February 28, 2017
INVENTOR(S) : Betscher et al.

It is certified that error appears in the above-identified patent and that said Letters Patent is hereby corrected as shown below:

In the Claims

In Column 9, Line 48:
Replace "CM"
With --cm--

Signed and Sealed this
Twenty-seventh Day of March, 2018

Andrei Iancu
*Director of the United States Patent and Trademark Office*